United States Patent
Wyser

(10) Patent No.: US 6,190,794 B1
(45) Date of Patent: Feb. 20, 2001

(54) PRISMATIC STORAGE BATTERY OR CELL WITH COILED WINDING

(75) Inventor: Paul Julian Wyser, Appenzell (CH)

(73) Assignee: Renata AG, Itingen (CH)

( * ) Notice: Under 35 U.S.C. 154(b), the term of this patent shall be extended for 0 days.

(21) Appl. No.: 09/275,886

(22) Filed: Mar. 25, 1999

(30) Foreign Application Priority Data

Mar. 30, 1998 (EP) .................................. 98105758

(51) Int. Cl.⁷ .................................. H01M 10/04
(52) U.S. Cl. ..................... 429/94; 429/178; 429/208; 429/211
(58) Field of Search ................ 429/94, 208, 178, 429/211

(56) References Cited

U.S. PATENT DOCUMENTS

| 4,053,687 | * | 10/1977 | Coibon et al. ................ 429/94 |
| 5,198,313 | * | 3/1993 | Juergens ...................... 429/94 |
| 5,658,683 | | 8/1997 | Kageyama et al. . | |

FOREIGN PATENT DOCUMENTS

| 2528631 | 6/1983 | (FR) . |
| 2 528 631 | 12/1983 | (FR) . |
| 1 144 438 | 5/1966 | (GB) . |
| 57 163965 | 10/1982 | (JP) . |
| 59 117076 | 7/1984 | (JP) . |

\* cited by examiner

Primary Examiner—John S. Maples
(74) Attorney, Agent, or Firm—Pollock, Vande Sande & Amernick, R.L.L.P.

(57) ABSTRACT

Prismatic battery including a metal container (1) within which is arranged a non circular spiral winding (2) of at least one composite strip (10) including an anode (2a) and a cathode (2c), separated by porous separators (2b) impregnated by an electrolyte, said container (1) being sealed at its upper portion by a cover (4). The spiral winding (2) is formed around a rigid spool (20) including an upper flange (21), having the dimensions of the opening of the cavity (16), and a lower flange (22), having the inner dimensions of the bottom (15), said flanges being joined by a central neck (24) and, on either side, by two lateral necks (23, 25), said necks (23, 24, 25) delimiting two openings (26a, 26c) in the median portion of the spool (20) and a free space (27) at its periphery to accommodate the winding (2).

11 Claims, 3 Drawing Sheets

Fig. 1
(PRIOR ART)
Fig. 1A
(PRIOR ART)
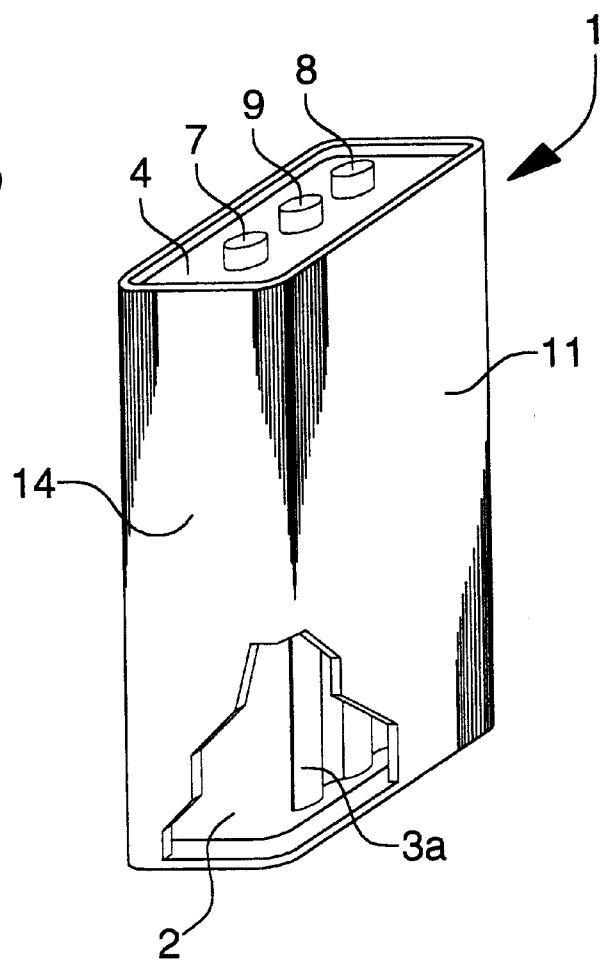
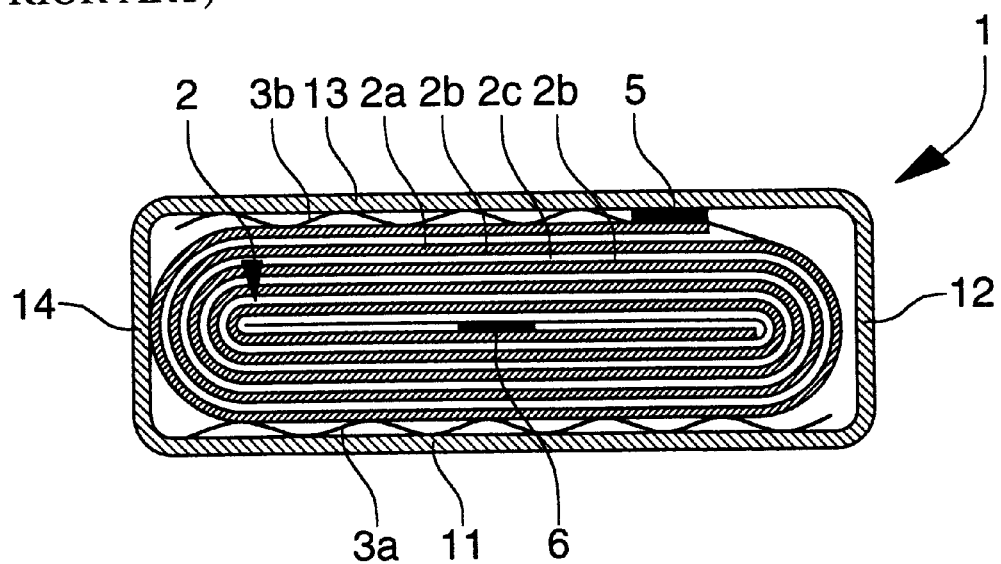

PRISMATIC STORAGE BATTERY OR CELL WITH COILED WINDING

TECHNICAL FIELD

The present invention concerns a storage battery or prismatic cell, designated hereinafter by the generic term <<battery>>, whether the power source is rechargeable or not. The invention concerns more particularly such a battery in which the power source is formed of a winding of active materials of the jelly roll type.

BACKGROUND OF THE INVENTION

In portable equipment, such as mobile telephones, prismatic shaped batteries are generally preferred to rod shaped ones in particular to reduce the overall size of the equipment. This portable equipment, which must by definition be light, generally incorporates electronic circuits and components which are fragile and often demanding from the point of view of power consumption. It is thus desirable for the prismatic batteries used in such equipment to have high power density while being light and of the lowest manufacturing cost possible, for them to have sufficient longevity, in particular in the case of storage batteries, and for them to have during use all necessary guarantees from the safety point of view, as regards both the user and the contiguous electronic circuits.

An object of the present invention is to provide a prismatic battery which has a high volumic power density, is lighter, a lower manufacturing cost than the prismatic batteries of the prior art as a result of a new concept of the jelly roll type of winding and which also allows safety of use to be increased.

The prismatic batteries of the prior art, schematically shown in FIGS. 1 and 1A are formed by a metal container 1 of parallelepiped shape, within which is placed a non circular spiral winding 2, of the jelly roll type, which has then been impregnated by an electrolyte. It will be noted that, in order to obtain the highest possible power density, i.e. to be able to introduce into the container the greatest possible quantity of active materials, it is imperative that the electrolyte is added after winding 2 is put in place, because of the swelling phenomena. This winding, which is obtained from one composite strip including a layer of active material forming anode 2a, a porous separator 2b, a layer of active material forming cathode 2c and a second porous separator 2b, does not allow precise positioning of the electric connection zones of anode 2a and cathode 2c to be obtained. It is therefore necessary to provide intermediate connection means 5, 6 between said connection zones and external contacts terminals 7, 8 situated for example on a cover 4 hermetically sealed to container 1. These intermediate connection means 5, 6 have to be welded to the inside of the container, which means that it is difficult to control the quality thereof. Each additional weld represents a risk of malfunction, either because of mechanical shocks during use, or because of mechanical stress which will be exerted after assembly, in particular during charging/discharging cycles for a storage battery. This jelly roll is generally held compressed for example by means of two corrugated elastic plates 3a, 3b, arranged between the large walls of container 1 and said winding 2. These elastic plates also allow small variations in volume of winding 2 during charging/discharging cycles to be absorbed. This type of prismatic battery, in particular in the case of a storage battery, generally also includes a safety vent schematically shown at 9. This safety vent 9 is in fact necessary given the chemical reactions which take place and which can cause an increase in pressure and/or temperature.

The jelly roll has advantages as regards the current density which is theoretically available, but requires a certain number of precautions to be taken, both as regards the manufacture thereof and the installation thereof in the metal container. Indeed, to have a maximum current density, it is important for the winding to have good cohesion at every point, i.e. for all the alternate layers of active materials and separators to be perfectly in contact with each other. This result is easily obtained for the rectilinear portion of the winding as a result of the compression means, for example by means of elastic plates 3a, 3b. For the curved portions at each end, the cohesion essentially depends upon the manufacturing method. In the current state of the art, a jelly roll is obtained first by effecting a winding on a cylindrical core which is then removed prior to exerting compression to give it an ellipsoidal shape suited to the opening of the container. In order to reduce dislocations observed in the curved portion of the jelly roll, U.S. Pat. No. 5,658,683 proposes using a substantially rhombic shaped core. In all cases, the winding obtained has to be manipulated with precaution to be introduced into the container at the same time as the elastic plates. In series manufacturing it is thus necessary to have improved automated equipment, which will have an influence on the unit price of the final product.

SUMMARY OF THE INVENTION

The object of the present invention is to overcome the aforementioned drawbacks by providing a prismatic battery in which a coiled winding of the jelly roll type provides, with a low manufacturing cost, high power density, increased reliability and longevity, and greater safety of use when the coiled winding is associated with a container of a particular shape.

The invention therefore concerns a prismatic battery including a metal container formed of at least two large walls, two small walls and a bottom delimiting a cavity within which is arranged a non circular spiral winding of at least one composite strip to form successive turns including an anode and a cathode separated by porous separators, the assembly being impregnated by an electrolyte, said container being sealed at its upper portion by a sealed cover carrying two contact terminals electrically connected to the anode and the cathode via connection means, characterised in that said spiral winding is formed around a rigid spool including an upper horizontal flange, having substantially the dimensions of the opening of the cavity, and a horizontal lower flange, having substantially the internal dimensions of the bottom, said flanges being joined by a vertical central neck and, on either side by two lateral necks, said necks delimiting two openings in the median plane of the spool and a free space at the periphery thereof to house the spiral winding.

A prismatic battery of the type which has just been described can be provided with usual connection means, such as a strip or a flexible conductive wire arranged, either at each end of the winding, or between the openings delimited by the necks. According to another aspect of the invention, said connection means are formed by two metal rods or tubes arranged between the openings, which are flattened in the portion situated between the two flanges and one of whose ends passes through the upper flange through orifices arranged therein.

According to another aspect of the invention the axial positioning of said rods or said tubes is also obtained as a result of orifices situated in the lower flange to accommodate the other end of each rod or tube.

According to another aspect of the invention, the upper and lower flanges are further provided with positioning orifices at right angles to the lateral necks and on either side of the median portion of the spool, said orifices being provided for setting in place positioning rods during coiling of the winding. Once the winding is obtained, the positioning rods are removed; which allows any mechanical stress on the weld points between the metal rods or tubes and the anode and cathode to be removed.

The invention also concerns a prismatic battery including in a metal container a coiled winding of the type which has just been described, said container having its large walls recessed by stamping after the spool has been set in place, so as to produce gripping of the lower flange. In such case, the lower flange has a greater width than that of the upper flange. Such a construction contributes to increasing the safety of use of such a battery.

The invention also concerns prismatic batteries having various coiling modes of one or more composite strips according to the composition of said strips and the manner in which they are fixed to the connection means and to the necks of the spool.

BRIEF DESCRIPTION OF THE DRAWINGS

Other features and advantages of the present invention will appear more clearly in the following description with reference to the annexed drawings, in which:

FIGS. 1 and 1A show in perspective view and in cross-section a prismatic battery of the prior art;

DETAILED DESCRIPTION OF THE INVENTION

Figure 2:
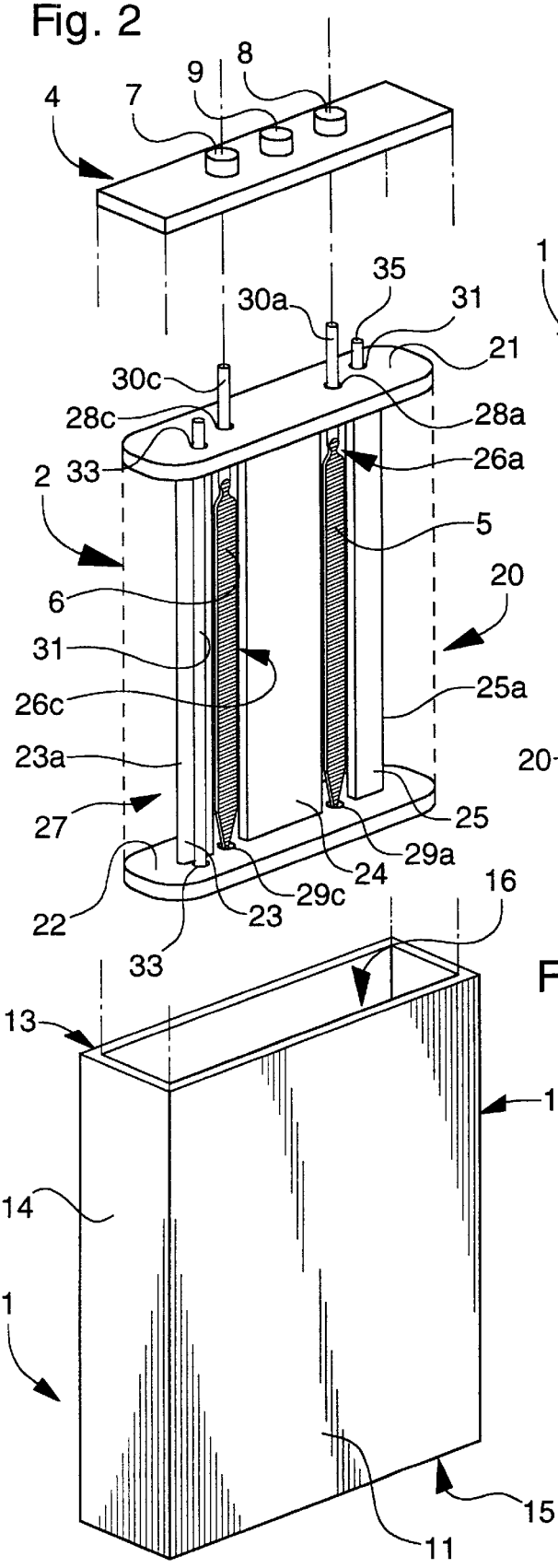
FIG. 2 shows an exploded perspective of a prismatic battery according to the invention.

Since FIGS. 1 and 1A have already been described in the preamble as representative of the state of the art, FIGS. 2 which shows an exploded perspective view of the three essential parts of a prismatic battery, i.e. the metal container 1, the spiral winding 2 and cover 4. Container 1 is formed of a tubular member, including two large walls 11, 13 and two small walls 12, 14. Container 1 is closed at its lower portion by a rectangular bottom 15, delimiting a cavity 16 intended to accommodate a spiral winding 2 of active material of the jelly roll type, impregnated by an electrolyte, the assembly being then hermetically sealed by cover 4 which is welded to the container, and on which are provided contact terminals 7, 8 and generally a safety vent 9.

As has been indicated, one of the difficulties is obtaining a perfectly compact spiral winding 2 with no mechanical stress at the welds of the connection means and with no risk of dislocation in the curved portions. For this purpose, winding 2 is formed on a spool 20 made of a rigid insulating material including an upper flange 21 and a lower flange 22 both having substantially the dimensions of the opening of container 1, preferably with rounded corners to facilitate its setting in place in cavity 16. These two flanges 21, 22 are joined by three necks 23, 24, 25 perpendicular to their plane along the large axis of said flanges, i.e. along the median plane of spool 20. Necks 23, 24, 25 delimit in the central portion two openings 26a, 26c and at the periphery a free space 27 intended to accommodate winding 2. In the preferred embodiment, shown in FIG. 2, spool 20 has axial symmetry, central neck 24 having a greater width than lateral necks 23, 25.

Along the axis of openings 26a, 26c, upper flange 21 is provided with orifices 28a, 28c and lower flange 22 is provided with orifice 29a, 29c, said orifices being provided for the passage and positioning of connection means 5, 6 between winding 2 and contact terminals 7, 8. In the preferred embodiment, shown in FIG. 2, these connection means are formed by metal rods 30a, 30c for example made of copper for the anode and aluminium for the cathode, said rods being flattened in the portion thereof comprised between upper flange 22, from it they emerge through orifices 28a, 28c to form external contact terminals 7, 8, and lower flange 22, in which they are positioned as a result of orifices 29a, 29c. As will be seen hereinafter, according to different variants, the three necks and the flattened portions of the two rods 30a, 30c allow the beginning of one or more composite strips to be fixed. In the preferred embodiment, the spool is also provided with a device allowing any mechanical stress at the welds between anode 2a and cathode 2c of winding 2 and connections means 5, 6, i.e. the flattened portions of rods 30a, 30c, to be removed. This device consists in positioning orifices 33, 35 made in upper flange 21 and in lower flange 22, and arranged substantially in the middle of lateral necks 23, 25, on either side of the median portion. These orifices 33, 35 are intended to accommodate positioning rods 31 which are set in place when the winding operation is started. The winding can be effected in a taut manner, which allows perfect cohesion to be obtained between the different turns of the winding. Once the winding is finished, positioning rods 31 are removed, which removes the stress at the welds and even leaves a certain play so that no mechanical stress is generated, for example during charging/discharging operations for a storage battery. Spool 20 is made for example of a plastic material, such as polybutylene terephtalate (PBT), by injection moulding. It may also be made of any other thermoplastic or thermosetting insulating material which is stable in the electrolyte used. In a prismatic battery having substantially as external dimensions 48×34×10 mm, a thickness of 0.8 to 1 mm is suitable for forming flanges 21, 22 and necks 23, 24, 25 of PBT and giving the spool sufficient rigidity. In order to avoid damaging winding 2 in the distal portions of the spool, and in particular for the first turns, it will be observed that external edges 23a, 25a of the lateral necks can be give a rounded shape.

Figure 3:
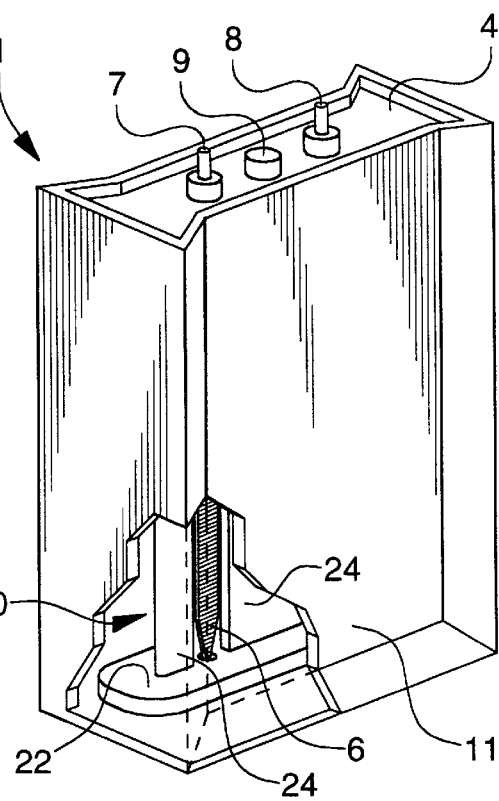
FIGS. 3 and 3a show in partially torn away perspective and in cross-section a particular container adapted to the spool.
Figure 3A:
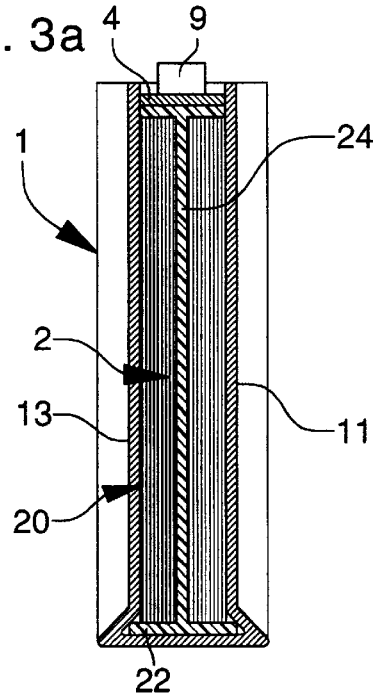

FIGS. 3 and 3A show that winding 2 on spool 20 is placed in a container 1 of generally prismatic shape, but whose large walls 11, 13 have been recessed by stamping, which, amongst other consequences, generates gripping of lower flange 22 of the spool (visible in FIG. 3A). It is then necessary for the width of upper flange 21 to be smaller to adapt to the width of the opening of container 1. Such a design associating one of the construction elements of the spool with a particular shape of container 1 contributes to increasing the safety of use of a spool of this type by mechanical fixation which avoids traction on the contact terminals or electrodes for example in the event of a shock.

Figure 4:
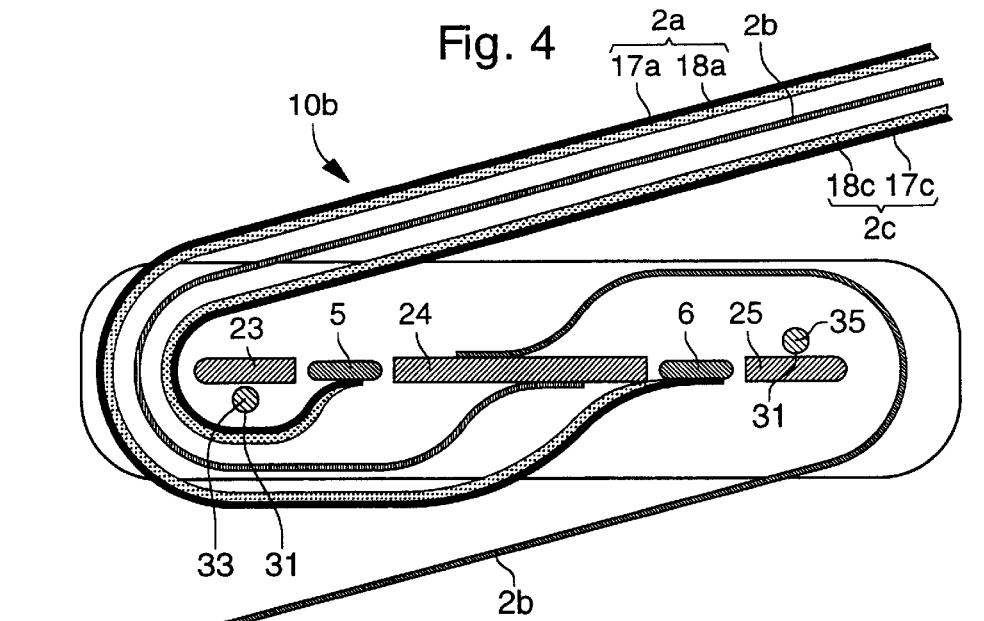
FIG. 4 is a cross-section along a plane parallel to the base of the battery of a first mode of coiling around the spool.
Figure 5:
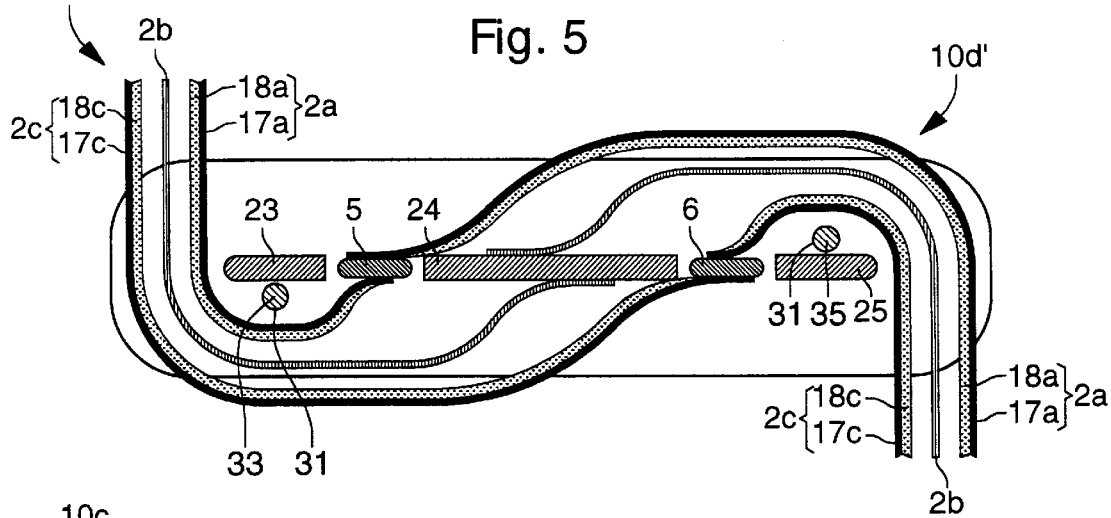
FIG. 5 is a cross-section along a plane parallel to the base of the battery of a second mode of coiling around the spool.
Figure 6:
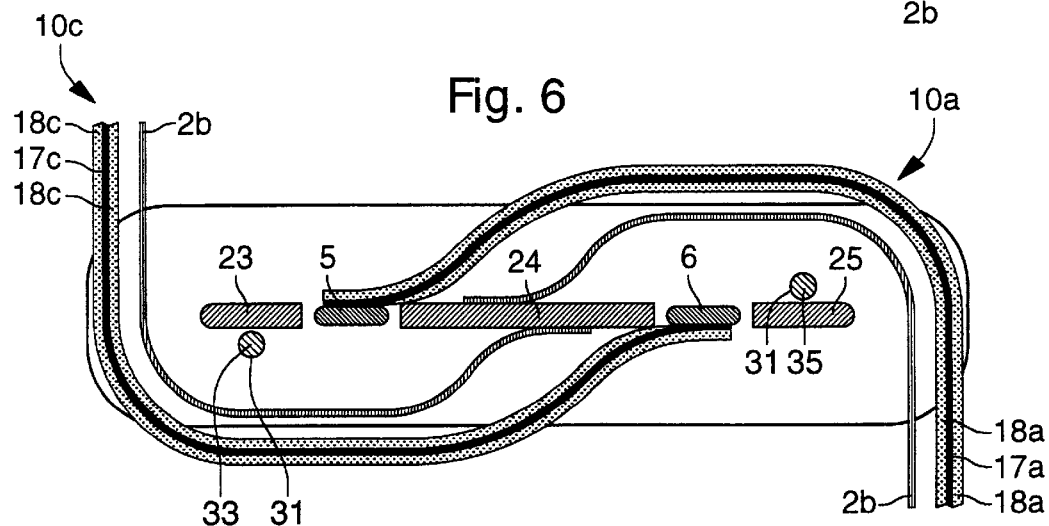
FIG. 6 is a cross-section along a plane parallel to the base of the battery of a third mode of coiling around the spool.

With reference now to FIGS. 4, 5, 6 three coiling modes made possible by the use of the spool which has just been described as the central core will be described hereinafter.

In FIG. 4 the coiling is effected with a composite strip 10b including on either side of a first porous separator 2b two supports 17a, 17c, whose facing sides are coated with active materials 18a, 18c, respectively forming anode 2a and cathode 2c, the assembly thereby formed having a second porous separator 2b on one of its external surfaces. In order to form the anode a thin sheet of copper coated with an active material forming the anode will for example be used, and for the cathode a thin sheet of aluminium coated with an active material forming the cathode. At one end of the strip anode 2a, cathode 2c and the first separator 2b are separated and positioned on the same side of spool 20 so as to be able to weld respectively the electrodes onto the flattened portions of connection rods 5, 6 and bonded first separator 2b onto central neck 24. Second separator 2b is positioned on the other side of the spool and bonded either onto central neck 24, or onto that of lateral necks 23 or 25 which are situated in the direction of the coiling, so as to insulate the electrodes of opposite polarity during the passage of the first turn.

In the embodiment shown in FIG. 5, winding 2 on spool 20 is formed from two composite strips 10d and 10d', having the same structure, positioned on either side of the spool, so as to be able to both be coiled in the same direction. Each strip 10d and 10d' includes on either side of a separator 2b two supports 17a, 17c whose facing sides are coated with active materials 18a, 18c respectively forming anode 2a and cathode 2c. The ends of each strip 10d, 10d' are fixed on either side of spool 20 by welding to respective connections means for anode 2a and cathode 2c, and by bonding onto central neck 24 for separators 2b. As can be understood, the coiling will position the respective supports 17a, 17c of each strip 10d, 10d' against each other.

In a third embodiment shown in FIG. 6, winding 2 on spool 20 is formed from two composite strips 10a, 10c having similar structures, positioned on either side of the spool so as to be able both to be coiled in the same direction. A first strip 10a includes a support 17a, coated on both sides with an active material 18a forming anode 2a, and a porous separator 2b. Likewise, a second strip 10c includes a support 17c, coated on both sides with an active material 18c forming cathode 2c. As previously, anode 2a and cathode 2c are welded to their respective connection means 5, 6 and the separators to central neck 24. This construction offers the advantage of providing a greater power density since this type of electrode has only one support (aluminium and copper).

The embodiments described hereinbefore, both as regards the making of the spool and the coiling modes, are capable of being adapted by those skilled in the art to the specific shape of a battery, without departing from the scope of the present invention.

What is claimed is:

1. A prismatic battery comprising:
    a metal container formed of at least two large walls, two small walls and a bottom delimiting a cavity; and
    a non circular spiral winding arranged in said cavity and formed around a rigid spool including a horizontal upper flange having dimensions substantially the same as an opening of the cavity, and a horizontal lower flange having dimensions substantially the same as inner dimensions of the bottom;
    said spiral winding comprising successive turns of at least one composite strip including an anode and a cathode separated by a porous separator impregnated by an electrolyte, the opening of said container cavity being sealed by a cover carrying two contact terminals electrically connected to the anode and the cathode via connection means;
    and said flanges being joined by a vertical central neck and, on either side of said central neck, by two lateral necks, said necks delimiting two openings in a median part of the spool and a free space at its periphery to accommodate the spiral winding.

2. A prismatic battery according to claim 1, wherein the connection means are arranged in the openings arranged between the necks.

3. A prismatic battery according to claim 1, wherein the upper flange of the spool further includes orifices arranged between the central neck and each lateral neck, and wherein the connection means are formed by metal rods, flattened in a portion thereof between the two flanges and projecting from the upper flange of the spool through said orifices to form the contact terminals.

4. A prismatic battery according to claim 3, wherein the lower flange also includes orifices allowing the metal rods to be positioned.

5. A prismatic battery according to claim 1, wherein outer edges of the lateral necks are rounded along a sufficient radius of curvature to allow passage of first turns of the winding without the destruction thereof.

6. A prismatic battery according to claim 1 further comprising positioning rods, and wherein the upper flange and the lower flange are further respectively provided with positioning orifices situated adjacent to the lateral necks and arranged on either side of the median part of the spool, said orifices being provided to accommodate the positioning rods which are arranged to be removed after coiling of the winding.

7. A prismatic battery according to claim 1, wherein the winding is formed of a single composite strip including on either side of a first separator two supports having facing sides coated with active materials forming respectively the anode and the cathode, the composite strip thereby formed having a second separator on an external surface, and wherein on the one hand, the anode, the cathode and the first separator are positioned on a same side of the spool, the anode and cathode being attached respectively to the connection means by welding and the first separator being attached to the central neck by bonding, and on the other hand, the second separator is positioned on another side of the spool and bonded onto the central neck, or onto one of the lateral necks situated in a direction of the winding.

8. A prismatic battery according to claim 1, wherein the winding is formed of two composite strips having the same structure and including on either side of a separator two supports having facing sides coated with active materials forming respectively the anode and the cathode, and wherein each composite strip is fixed on either side of the spool by welding its supports to the respective connection means for the anode and the cathode and by bonding its separator onto the central neck, the two strips being coiled in the same direction to come into contact with each other via sides which are not coated with active materials.

9. A prismatic battery according to claim 1, wherein the winding is formed of two composite strips having the same structure, a first one of said strips including a support, which is coated on both sides with an active material forming the anode, and a porous separator attached on one side of the spool respectively to a first connection means by welding and to the central neck by bonding, and a second one of said strips including a support, which is coated on both faces with an active material forming the cathode, and a separator attached on the other side of the spool respectively to a second connection means by welding and to the central neck by bonding, the two strips being coiled in the same direction to come to face each other.

10. A prismatic battery according to claim 1, wherein a width of the lower flange of the spool is greater than a width of the upper flange to allow the gripping thereof at the bottom of the cavity of the container by recessing the large walls.

11. A prismatic battery according to claim 1, wherein the spool is made of a PBT (polybutylene terephtalate) insulating material, a thermoplastic insulating material, or a thermo-setting insulating material.

* * * * *